Sept. 10, 1946.  A. J. HODGES  2,407,278
METHOD OF AND APPARATUS FOR TESTING THE HARDNESS OF MATERIALS
Filed April 10, 1945  2 Sheets-Sheet 1
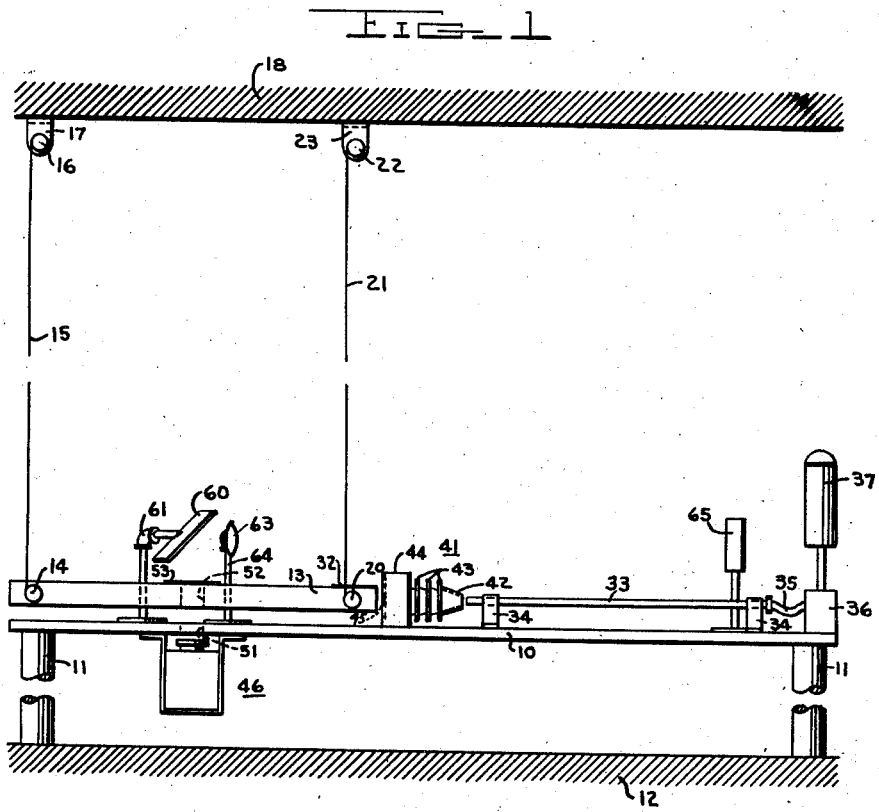
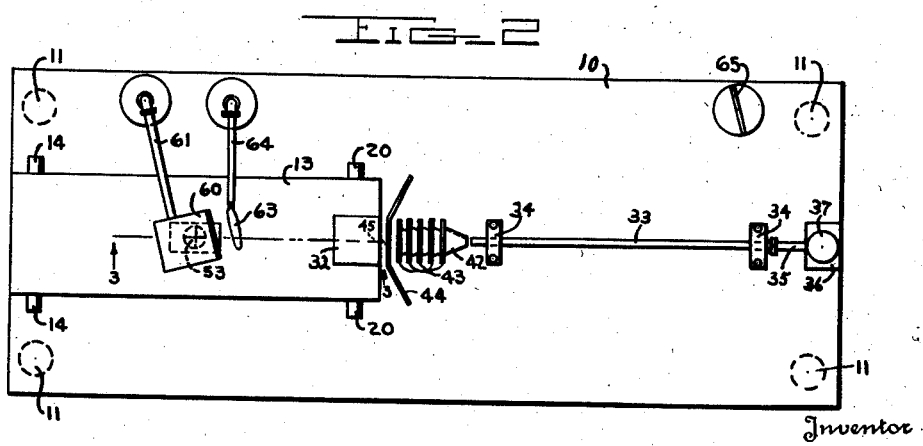
ARTHUR J. HODGES
Inventor Sept. 10, 1946.  A. J. HODGES  2,407,278
METHOD OF AND APPARATUS FOR TESTING THE HARDNESS OF MATERIALS
Filed April 10, 1945   2 Sheets-Sheet 2
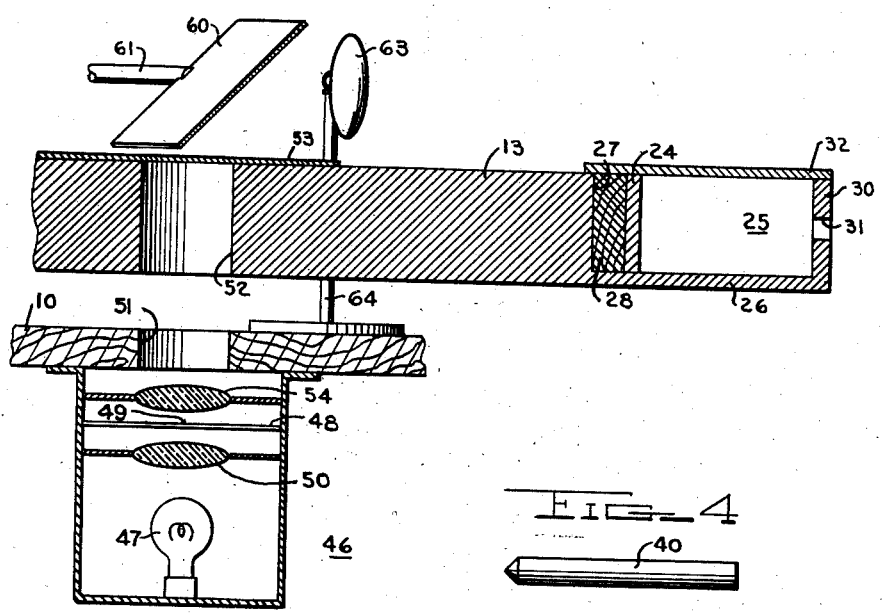
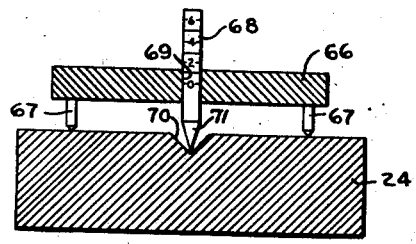
ARTHUR J. HODGES Patented Sept. 10, 1946

2,407,278

UNITED STATES PATENT OFFICE 2,407,278

METHOD OF AND APPARATUS FOR TESTING THE HARDNESS OF MATERIALS

Arthur J. Hodges, Washington, D. C.

Application April 10, 1945, Serial No. 587,601

12 Claims. (Cl. 73—82)

(Granted under the act of March 3, 1883, as amended April 30, 1928; 370 O. G. 757)

This invention relates to a method of and apparatus for testing the hardness of materials and more particularly to a method of and apparatus for dynamically testing the hardness of materials.

One practice in ascertaining the hardness of materials has been to employ a device known as a static hardness tester. As is well known, the results of a static hardness test depend in large part upon the length of time for which the load is applied. Some materials have been found to be so sensitive to the loading time that the accuracy of the static hardness test is materially affected thereby. Also, in ascertaining the hardness of armor plate the static hardness test does not simulate satisfactorily the actual conditions present when a projectile strikes the armor plate.

An object of the present invention is to provide an efficient, effective method of and apparatus for dynamically testing the hardness of materials.

In accordance with one embodiment of this invention, the hardness of a material is measured in terms of the energy required to produce a unit volume of indentation. An indenter is caused to strike the surface of a specimen plate of the material being tested, the plate being supported in a ballistic pendulum, and the deflection of the pendulum is measured by means of an optical system which magnifies the deflection. Knowing the deflection of the pendulum, the weight of the indenter, and the weight and period of the pendulum, the kinetic energy of the indenter at the moment of impact may be accurately calculated. The volume of the indentation caused on the specimen plate by the indenter is then measured and the hardness of the material being tested calculated in terms of the kinetic energy of the indenter divided by the volume of the indentation.

Other objects and advantages of the present invention will be apparent from the following detailed description taken in conjunction with the drawings, wherein:

Fig. 1 is a side elevation of a dynamic hardness testing apparatus constructed according to this invention;

Fig. 2 is a plan view of the apparatus shown in Fig. 1;

Fig. 3 is a fragmentary, enlarged, sectional view along the line 3—3 of Fig. 2, showing the light source and associated optical elements in detail;

Fig. 4 is a detail, side view of an indenter used with this apparatus; and

Fig. 5 is a vertical, sectional view of a specimen plate after indentation, having a device located thereon for measuring the depth of indentation.

Referring now to the drawings and particularly to Figs. 1 and 2 thereof, it will be seen that the apparatus of this invention includes a flat, horizontally disposed platform, or table, 10 having a rectangular upper surface. The table is supported on four legs 11 which extend downwardly from the four corners of the table and are mounted on a suitable foundation 12. Immediately above the left portion of the table and substantially parallel thereto is suspended, as a part of a ballistic pendulum, an elongated rectangular block 13 which serves as a holder for the specimen plate of the material to be tested and also serves as a weight for the pendulum. Additional weight may be added to the block by placing weights thereon as required to increase the mass of the pendulum. It is desirable that the surface areas of the ends of the pendulum be reduced to a minimum in order to reduce, insofar as possible, air resistance to a negligible factor.

In order to provide a pendulum suspension for the block 13 which will not be affected by the shock of impact and which will, at the same time, provide a minimum resistance to movement, two spools 14 are rigidly mounted on either side of the block 13 near the left end thereof. Two strands 15, only one being shown, are associated with the two spools 14 and have their lower ends fixed to the underside thereof, while their upper ends are fixed to the upper sides of a corresponding pair of spools 16, only one of which is illustrated. The spools 16 are mounted on brackets 17 attached to an overhead support 18 which extends parallel to the table top 10. Two spools 20 are similarly mounted near the right end of the block 13 and have attached thereto strands 21, the upper ends of which are attached to the upper sides of a pair of spools 22 mounted on brackets 23 fixed to the overhead support 18. All eight spools are of the same diameter, and the spools 16 and 22 are spaced apart the same distance as the spools 14 and 20 on the block 13. It will be noted that the several strands are so attached to the spools, associated therewith, that in each case the strand bears against the left side of the spool, as shown in Fig. 1. Since the lengths of the several supporting strands are in each case the same, it will be apparent that, while the block 13 is free to move as a pendulum, it will, during its arc of movement, maintain parallelism with the table 10. By spacing the two spools 16, or the two spools 20, or both, apart a distance somewhat greater than the separation between the two spools 14, or the two spools 22, sideway of the block may be substantially prevented, and the block will be constrained to swing in an arcuate path lying in a vertical plane perpendicular to the plane in which the two strands 14 and the two strands 21 lie.

In order to provide a holder for a flat, rectangular specimen plate 24, as shown in Fig. 3, the right end of the block 13 has formed therein a rectangular recess 25 in its upper center portion. A shelf 26, integrally formed with the front portion of the block 13, extends along the bottom of the recess 25, while a front plate 30, which may be integrally formed with the block 13, encloses the front portion of the recess. An aperture 31 is formed through the front plate 30 to permit the missile to enter the recess, and the recess is made long enough so that the missile upon rebounding from the specimen plate will strike the front plate below the level of the aperture 31. A suitable lid 32 or cover plate, such as that shown in Figs. 1 and 2, may be placed over the recess 25 to prevent the indenter from bouncing out of the recess.

In the operation of the apparatus, a specimen plate of the material to be tested is placed on the shelf 26 and spaced from the rear wall 27 of the recess by a rectangular block 28 of wood or similiar shock-absorbent material. The specimen plate may be wedged in place between the sides 29 of the recess or other suitable means provided for retaining the specimen plate in place in the recess and holding it rigidly against the block 28 so that if a force be applied to the plate 24, at right angles to the surface thereof, the direction of such a force will be aligned exactly with the normal path, or arc, of movement of the pendulum block 13.

An air gun 33, formed by a straight tube of circular cross section, is mounted on the right portion of the table 10 and so located thereon that its axis is in alignment with the path of movement of the pendulum block 13 and its left end adjacent the center of the recess 25 in the block 13. Thus when an object is shot from the gun, it will strike a specimen plate located in the recess 25 at an angle precisely normal thereto and substantially at the center thereof. The gun 33 is mounted on two spaced brackets 34 which are fixed to the table 10. A flexible pipe, or hose, 35 is detachably connected to the right end of the gun 33 and has its other end connected through a quick-acting valve 36, such as a solenoid actuated valve, to a suitable source 37 of air under high pressure.

In loading the gun, the hose 35 is detached from the end of the gun, and a conically tipped indenter 40, having a cylindrical-body portion, is inserted in the right end of the tube 33. While a conical tip is preferable for most uses, a pyramidal, wedge, or rounded tip might be employed without departing from the present invention. The indenter 40 is shown in detail in Fig. 4. It will be understood that the internal diameter of gun 33 is such that the indenter body closely engages the internal surface of the gun so that a minimum amount of air will leak past the indenter, and the maximum feasible pressure is utilized for propulsion. A suitable lubricant may be applied to the indenter or to the interior of the gun if required. After the indenter has been inserted in the right end of the gun 33, the flexible pipe 35 is connected to the right end of the gun and the valve 36 opened. It is desirable that the action of this valve be very rapid so that full pressure from the air-pressure source 37 is applied to the indenter substantially immediately after the valve is actuated.

If sufficient pressure is applied to the indenter, it will leave the end of the gun 33 at a high velocity and pass through a baffle assembly 41 comprising a plurality of hollow, truncated cones 42. The axes of the cones 42 are coaxial with the axis of the gun 33, and, as shown in Figs. 1 and 2, the smaller ends of the cones point toward the muzzle of the gun 33. At the base of each of the cones is formed a deflecting flange 43 which extends substantially at right angles to the axis of the cone. It will be apparent from the foregoing that, when an indenter is propelled through the gun 33, the blast of air which follows the indenter will be deflected by the baffle assembly provided by the cones 42, and very little of the force of the air will be applied to the forward end of the block 13. In order to further reduce the amount of air blast which reaches the block 13, a plate 44 is mounted between the end of the baffle assembly and the block 13 and is provided with an aperture 45 coaxial with the axis of the gun 33 and of sufficient diameter to permit the indenter to pass therethrough. The sides of this plate are bent away from the block 13, as shown in Fig. 2, to aid in deflecting away from the block 13 any air currents resulting from the air blast.

When the indenter strikes the surface of the specimen plate 24, mounted in the recess 25, formed in the end of the block 13, it will cause an indentation conforming in configuration to the shape of the tip of the indenter. At the same time there will be an exchange of momentum causing the pendulum to move to the left. By providing the enclosed recess 25 to catch the indenter, if it rebounds from the plate, it will be apparent that the momentum of the indenter is conserved. Consequently, the distance which the block 13 moves will be directly proportional to the velocity of the indenter.

In order to ascertain accurately the exact distance which the block 13 moves as a result of the impact of the indenter 40, a light source 46 is mounted on the underside of the left portion of table 10, as shown in Figs. 1 and 3. This light source includes a lamp 47, the rays of light from which are focused on a transparent plate 48, which is provided with a cross hair 49, by a suitable lens 50 interposed between the lamp and the plate. The cross hair extends in a line at right angles to the path of the indenter. An aperture 51 is formed in the table above the lamp 47 to permit the image of the cross hair to be projected through an aperture 52, formed in the block 13, onto a screen 53 by a lens 54 positioned immediately above the plate 48. Suitable calibrations are provided on the screen 53 extending parallel to the path of the pendulum to facilitate measurement of the displacement of the pendulum.

When the block 13 is at rest, an image will be produced on the screen 53 of the cross hair 49, the image of the cross hair being located substantially in the center thereof. Movement of the block 13 with respect to the light source 46 will, of course, move the calibrated screen transversely with respect to the image of the cross hair and will thereby directly indicate the distance of movement.

In order to facilitate observation of the movement of the screen 53 relative to the image of the cross hair, a mirror 60, supported by a bracket arm 61, is located immediately above the screen 53 and disposed at an angle thereto so that the image from this screen may be passed through a projection lens 63, mounted on a bracket arm 64, which is supported on the table 10, and projected onto a translucent screen 65 located at the right, rear corner of the table. By projecting the image of the screen 53, it will be apparent that the image will be substantially magnified, and, consequently, any small movement of the block 13 made readily observable. It would, of course, be feasible to locate the screen 65 at any desired distance, commensurate with the strength of the light source 46, from the table 10 in order to obtain even greater magnification.

In practice it has been found difficult to observe accurately the distance of the first swing of the block 13. However, if the supporting strands are made sufficiently long, the period of the pendulum will be large enough so that the decrement in the length of the arc during the first few oscillations of the pendulum will be so slight that the accuracy of the observation will not be affected materially thereby.

By determining the amount of deflection of the ballistic pendulum, it is then possible to calculate the velocity of the indenter from previous knowledge of the mass of the indenter and the mass and period of the pendulum. It is also possible, in accordance with well-known formulae, to determine its kinetic energy. Then by determining the volume of the indentation, or impression, made in the specimen plate by the indenter, it is possible to calculate the hardness or resistance to deformation of the specimen plate in terms of the kinetic energy required to produce a unit volume of indentation.

While any suitable method which will produce accurate results may be employed to determine the volume of the impression made by the indenter on the specimen plate, a method employing the apparatus illustrated in Fig. 5 has been found to be satisfactory. In accordance with this method, a micrometer probe is inserted into the indentation formed in the specimen plate by the indenter 40 in order to measure the depth of the indentation. As shown in Fig. 5, a small, rigid, metal block 66 is supported parallel to and spaced from the surface of the specimen plate 24 by a number of legs 67 of equal length. A micrometer shaft 68, having a long pointed tip 71, is threaded into a vertically disposed aperture 69 formed in the center portion of the block 66 and extends from the base thereof. When the zero marking on the shaft 68 is level with the upper surface of the block 66, the lower tip 71 of the shaft is level with the lower ends of the legs supporting the plate 66 and consequently touches the surface of the specimen plate. By locating the shaft over the center of an indentation 70, formed in the surface of the specimen plate by the conical indenter 40, and moving the shaft downward until its tip 71 contacts the base of the conical indentation, it is possible to determine the depth of penetration of the indenter and the volume of indentation. The angle of the conical indentation will of course be the same as the angle of the conical tip of the indenter 40. Knowing the angle formed by the apex of the conical indentation and the depth of the indentation, the volume of the indentation may be readily calculated in accordance with the following formula:

$$V = \frac{\pi}{3} h^3 \tan \frac{\theta}{2}$$

wherein $V$ is the volume of indentation, $h$ the depth of indentation, and $\theta$ is the angle of the apex of the conical indentation. Then by dividing the volume of the indentation by the kinetic energy required to produce the indentation, the hardness of the material being tested may be determined.

While but one embodiment of this invention has been shown and described, it will be understood that many changes and modifications may be made therein without departing from the scope of the present invention.

The invention shown and described herein may be manufactured and used by or for the Government of the United States of America for governmental purposes without the payment of any royalties thereon or therefor.

What is claimed is:

1. In an apparatus for dynamically testing the hardness of a specimen plate of material, a ballistic pendulum for supporting a specimen plate, an indenter, means for propelling said indenter into contact with a specimen plate supported on said pendulum, and optical means associated with said ballistic pendulum for indicating in magnified degree the resulting deflection of said pendulum.

2. A method of dynamically testing the hardness of a specimen plate of material comprising causing an object to strike the surface of a specimen plate supported in a ballistic pendulum, measuring the deflection of the pendulum resulting from the object striking the specimen plate, measuring the volume of indentation caused by the object striking the specimen plate and then computing the hardness in terms of the kinetic energy required to produce a unit volume of indentation.

3. An apparatus for dynamically testing the hardness of a specimen plate of a material comprising a ballastic pendulum, means on said pendulum for supporting a specimen plate, means associated with said pendulum for indicating the degree of deflection of said pendulum, an indenter, means for causing said indenter to strike a specimen plate supported on said pendulum, and means for retaining said indenter on said pendulum after striking specimen plate.

4. An apparatus for dynamically testing the hardness of a specimen plate of a material comprising a ballistic pendulum, means on said pendulum for supporting a specimen plate, means associated with said pendulum for indicating the degree of deflection of said pendulum, an indenter, and means for causing said indenter to strike a specimen plate supported on said pendulum.

5. An apparatus for dynamically testing the hardness of specimen plate of a material comprising a ballistic pendulum, means on said pendulum for supporting a specimen plate, means associated with said pendulum for indicating the degree of deflection of said pendulum, an indenter, an air gun for propelling said indenter into contact with said specimen plate, and a baffle interposed between the exit end of said air gun and the pendulum to deflect away from the pendulum the air blast from the air gun.

6. An apparatus for dynamically testing the hardness of specimen plate of a material comprising a ballistic pendulum, means on said pendulum for supporting a specimen plate, means associated with said pendulum for indicating the degree of deflection of said pendulum, an indenter, and an air gun for propelling said indenter into contact with the specimen plate.

7. An apparatus for dynamically testing the hardness of a specimen plate of a material comprising a ballistic pendulum, means on said pendulum for supporting a specimen plate, an indenter, means for causing said indenter to strike a specimen plate supported on said pendulum, and an optical system associated with said apparatus for providing a magnified indication of the deflection of said pendulum resulting from the indenter striking the specimen plate.

8. An apparatus for dynamically testing the hardness of a specimen plate of a material comprising a ballistic pendulum, means on said pendulum for supporting a specimen plate, an indenter, means for causing said indenter to strike a specimen plate supported on said pendulum, an optical system associated with said apparatus for providing a magnified indication of the deflection of said pendulum resulting from the indenter striking the specimen plate, comprising a fixed light source, a cross hair associated with said light source, a calibrated screen on said pendulum, means for projecting an image of said cross hair on said screen, a second screen, and means for projecting an image of said calibrated screen on said second screen.

9. In an apparatus for dynamically testing the hardness of specimen plate of a material, means for supporting the specimen plate, an indenter, an air gun for propelling said indenter into contact with said specimen plate, and a baffle interposed between the exit end of said air gun and the specimen plate to deflect away from said specimen plate support the air blast from said air gun.

10. In an apparatus for dynamically testing the hardness of specimen plate of a material, means for supporting the specimen plate, an indenter, an air gun for propelling said indenter into contact with said specimen plate, and a baffle interposed between the exit ends of said air gun, and the specimen plate to deflect away from said specimen plate support the air blast from said air gun comprising a plurality of conical, truncated cones coaxially disposed with the axis of the air gun.

11. In an apparatus for dynamically testing the hardness of specimen plate of a material, means for supporting the specimen plate, an indenter, an air gun for propelling said indenter into contact with said specimen plate, and a baffle interposed between the exit ends of said air gun, and the specimen plate to deflect away from said specimen plate support the air blast from the air gun, the baffle including a conical, truncated cone coaxially disposed with respect to the axis of the air gun, and a flange associated with the base of said cone and extending at substantially right angles to the axis of said cone.

12. An apparatus for dynamically testing the hardness of a specimen plate of a material comprising a ballistic pendulum, means on said pendulum for supporting a specimen plate, an optical system associated with said pendulum for providing a magnified indication of the deflection of said pendulum, an indenter, an air gun for propelling said indenter into contact with said specimen plate, means for retaining said indenter on said pendulum after striking the specimen plate, and a baffle interposed between the exit end of said air gun and the pendulum to deflect away from the pendulum the air blast from said air gun.

ARTHUR J. HODGES.